United States Patent
Smith et al.

(10) Patent No.: US 11,710,857 B2
(45) Date of Patent: *Jul. 25, 2023

(54) RECYCLING OF COBALT AND NICKEL FROM LITHIUM-ION BATTERIES

(71) Applicant: American Hyperform, Inc., Philadelphia, PA (US)

(72) Inventors: William Novis Smith, Philadelphia, PA (US); Scott D. Swoffer, New Castle, DE (US)

(73) Assignee: American Hyperform, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,332

(22) Filed: Apr. 16, 2022

(65) Prior Publication Data
US 2023/0065685 A1    Mar. 2, 2023

Related U.S. Application Data

(63) Continuation of application No. 17/218,863, filed on Mar. 31, 2021, now Pat. No. 11,316,208.

(60) Provisional application No. 63/049,356, filed on Jul. 8, 2020.

(51) Int. Cl.
| | |
|---|---|
| *H01M 10/42* | (2006.01) |
| *H01M 10/54* | (2006.01) |
| *H01M 10/0525* | (2010.01) |
| *H01M 4/505* | (2010.01) |
| *H01M 4/525* | (2010.01) |
| *H01M 4/583* | (2010.01) |
| *C01G 53/00* | (2006.01) |
| *C22B 3/00* | (2006.01) |
| *C22B 47/00* | (2006.01) |

(52) U.S. Cl.
CPC ...... *H01M 10/4242* (2013.01); *C01G 53/006* (2013.01); *C22B 23/043* (2013.01); *C22B 47/0063* (2013.01); *H01M 4/505* (2013.01); *H01M 4/525* (2013.01); *H01M 4/583* (2013.01); *H01M 10/0525* (2013.01); *H01M 10/54* (2013.01)

(58) Field of Classification Search
None
See application file for complete search history.

(56) References Cited

U.S. PATENT DOCUMENTS

| | | | |
|---|---|---|---|
| 2,801,153 A | 7/1957 | Dwyer | |
| 6,120,927 A | 9/2000 | Hayashi | |
| 7,458,419 B2 | 12/2008 | Hold, III et al. | |
| 10,246,343 B2 | 4/2019 | Chow et al. | |
| 10,919,046 B2 | 2/2021 | Kochhar et al. | |
| 11,316,208 B2 | 4/2022 | Smith | |
| 2016/0045841 A1* | 2/2016 | Kaplan | C01B 32/05 429/49 |
| 2019/0260100 A1* | 8/2019 | Sloop | H01M 4/48 |
| 2020/0000787 A1 | 3/2020 | Kochhar et al. | |
| 2021/0000780 A1 | 3/2021 | Kochhar et al. | |
| 2021/0079495 A1* | 3/2021 | Harris | C22B 3/22 |
| 2022/0013815 A1 | 1/2022 | Smith | |

FOREIGN PATENT DOCUMENTS

| | | | | |
|---|---|---|---|---|
| CN | 101871048 B | | 5/2012 | |
| CN | 105206889 | * | 12/2015 | ........... H01M 10/54 |
| CN | 105206889 B | | 10/2018 | |
| CN | 111129632 | * | 5/2020 | ........... C01D 15/08 |
| CN | 111129632 A | | 7/2021 | |
| WO | 2017091562 A1 | | 6/2017 | |
| WO | 2022010975 A1 | | 1/2022 | |

\* cited by examiner

*Primary Examiner* — Jonathan Crepeau
*Assistant Examiner* — Angela J Martin
(74) *Attorney, Agent, or Firm* — Blanchard Horton PLLC

(57) ABSTRACT

A process for recovering a nickel cobalt manganese hydroxide from recycled lithium-ion battery (LIB) material such as black mass, black powder, filter cake, or the like. The recycled LIB material is mixed with water and either sulfuric acid or hydrochloric acid at a pH less than 2. Cobalt, nickel, and manganese oxides from the recycled lithium-ion battery material dissolve into the acidic water with the reductive assistance of gaseous sulfur dioxide. Anode carbon is filtered from the acidic water, leaving the dissolved cobalt, nickel, and manganese oxides in a filtrate. The filtrate is mixed with aqueous sodium hydroxide at a pH greater than 8. Nickel cobalt manganese hydroxide precipitates from the filtrate. The nickel cobalt manganese hydroxide is filtered from the filtrate and dried. The filtrate may be treated ammonium fluoride or ammonium bifluoride to precipitate lithium fluoride from the filtrate. The composition ratio of nickel to cobalt to manganese in the acid filtrate may be adjusted to a desired ratio. The anode carbon is recovered and purified for reuse.

23 Claims, 3 Drawing Sheets

RECYCLING OF COBALT AND NICKEL FROM LITHIUM-ION BATTERIES

REFERENCE TO RELATED APPLICATIONS

This application is a continuation of U.S. Nonprovisional application Ser. No. 17/218,863, filed Mar. 31, 2021, entitled "Process for Recycling Cobalt and Nickel from Lithium Ion Batteries," which claims the benefit of U.S. Provisional Application No. 63/049,356 entitled "Process for Recycling Cobalt and Nickel from Lithium Ion Batteries" filed Jul. 8, 2020, both of which are incorporated by reference in the entirety.

BACKGROUND

Cobalt and nickel are considered critical materials that are widely used and necessary for aerospace and high-performance steel alloys, especially for high temperature use in applications such as jet turbine engines and corrosion resistant metal parts. Cobalt and nickel also are considered critical materials for lithium-ion battery (LIB) production and are used in the cathode materials. A shortage of these materials could slow the growth of lithium-ion battery usage. As the use of LIB continues to grow rapidly, however, cobalt and nickel will become more difficult to obtain for LIB production due to their limited availability and the associated price considerations arising from limited sources. In addition, there already exists far larger competing requirements for cobalt and nickel in aerospace high alloy steels and other high-performance steels, which will further limit the availably of cobalt and nickel for LIB's.

Consequently, there is a need to increase total recovery of cobalt and nickel from recycled LIB's. Additionally, there is a need to improve the short-term and long-term recycling economics of LIB's and other related waste streams containing these two critical metals from all sources. Less than 15% of all LIB's used in electronics and other smaller applications are currently recycled due to low commercial value of the highly diluted 5-12% cobalt and 8-15% nickel present in the ground recycled Lithium-ion battery (LIB) material such as black mass, black powder, or filter cake or the like that is recovered in recycling these LIB's. This renders the cost of LIB recycling economically unfeasible unless a significant up-front recycling fee is paid. This relatively expensive up front recycling fee tends to reduce the amount of these smaller LIB's being collected and recycled.

The cathode materials of the LIB make up about 20-25% of the weight of the LIB. The graphite anode material makes up about 10-12% of the weight of the LIB. The cathode materials vary considerably in compositional range from high cobalt compositions such as $LiCoO_2$ in electronic applications to minimum cobalt and high nickel such as $LiNi_{0.6}Co_{0.2}O_2$ in some electric vehicle (EV) models. In addition, there are also high levels of manganese utilized in most commercial cathode materials such as $Li(Ni_{1/3}Mn_{1/3}Co_{1/3})O_2$.

In some automotive LIB applications, $LiMnO_2$ itself is also utilized. In the collection and sorting of LIB's for recycling, some LIB's containing $LiFePO_4$ may also be recycled with the non-iron containing LIB's which have the cathodes (spinel oxides) containing the desired cobalt and nickel along with manganese. These mixes of different cathode chemistries and compositions dilute the combined cobalt and nickel content and cause variation in the recycled LIB material product produced in conventional LIB recycling.

The recycled lithium-ion battery (LIB) material such as black mass, black powder, or filter cake or the like that is recovered from the LIB's contains the cobalt and nickel in combined amounts ranging from 12-25% along with manganese and with contaminates including iron, aluminum, anode carbon (graphite), copper from the anode collector foil, lithium, binder polymer, and phosphate. The metals are generally present as an oxide form except for iron, which is present as lithium iron phosphate. The current commercial uses for the recycled LIB material include: 1) processing in smelters to produce high alloy steel; and 2) converting to metal sulfate solutions for use in preparing new lithium-ion cathode materials. If the cobalt content of the recycled LIB material is less than 10%, a smelter may not accept it as a feedstock for processing into high alloy steels. Recycled LIB material often creates a blending difficulty for the LIB recyclers since the recycled LIB material frequently does not meet the 10% cobalt requirement. This further increases the cost of LIB recycling. This situation will become more acute as the overall cobalt content of LIB cathode materials is gradually being reduced due to technical reasons (e.g., the need for greater electric automotive battery range using increased nickel) and due to economic reasons (e.g., the higher cost and limited availability of cobalt).

In the case of the conversion of the recycled LIB material to a mixed metal sulfate solution, there is difficulty in achieving complete solution of all the metals due to the insolubility of the contained manganese oxide component. Expensive oxidation reagents are used and there is a significant time required to achieve complete solution. This also requires an excess of the sulfuric acid or other acid which must be removed later. The filtration removal of the contained carbon will leave varying amounts of iron, aluminum, phosphate, and other impurities which need to be removed. The subsequent purification processes of the sulfate by liquid/liquid extraction, ion exchange, and crystallization techniques are expensive and have significant material losses. It is difficult to adjust the contained cobalt, nickel, and/or manganese sulfates to achieve a stoichiometric ratio with sulfate eliminating any sodium sulfate and assuring a one-to-one ratio of metal cation-ions to the sulfate anions, which is required for commercial cathode production feed. There is a need for a minimum cost process that achieves this for a feed stock for lithium-ion cathode production and for a feed stock to a smelter for producing high alloy steels.

If the contained cobalt and nickel could be readily converted and upgraded to a high purity combination of only nickel cobalt manganese hydroxide (NiCoMn—OH) at low cost, the value of the recovered contained cobalt and nickel would increase over the present discounted market value for the smelter application and other related applications. This upgrade conversion would result in a two-fold increase in the concentration of these three metals and the elimination of all other impurities. Significantly increased value would result from the savings that would result from reduced freight costs, the elimination of pretreatment costs prior to the addition to the smelter, and the reduction in the required volume addition of the more concentrated cobalt and nickel material being added to the smelter. This purified nickel cobalt manganese hydroxide can also be sent directly to the hydrometallurgical processing facilities for obtaining pure nickel and cobalt compounds and metal. A wider range of applications would also be available. This nickel cobalt manganese hydroxide (NiCoMn—OH) could be readily converted to a purified solution of nickel cobalt manganese sulfate at low cost with no sodium sulfate or sulfuric acid remaining present. This recycled material would be a higher purity and lower cost source of nickel cobalt manganese sulfate feedstock for producing new lithium-ion battery cathode materials. Additionally, the economic gain for recycling LIB's would increase if the nickel to cobalt to manganese ratio could be adjusted to a desired ratio, especially for the smaller LIB's used in electronic applications. This would also result in a greater percentage of the smaller electronic LIB's being recycled and therefore more recovery and conservation of cobalt and nickel.

The difficult problem is to readily extract cobalt and nickel along with the low value manganese present (up to 18%) from the anode carbon (up to 45%), binder (up to 9%) which coats the particles hindering extraction, iron phosphate, and alumina; and perform this extraction with a high yield, high purity, and at low cost. If new LIB cathode material can be made directly with this recovered high purity nickel cobalt manganese hydroxide (NiCoMn—OH), this would complete the full recycling back to LIB's.

The present isolated recycled LIB material from the LIB recycle processes varies in value due to the variable high percentage of anode graphite, alumina, and manganese oxides present along with iron phosphate from the $LiFePO_4$ cathode materials which could be present if the LIB's are not sorted carefully.

A lower cost process is needed for converting recycled LIB material to a higher purity (more than 90%, preferably more than 98%) nickel cobalt manganese hydroxide (NiCoMn—OH) which would increase the value of this recovered material and widen its direct utilization for high value alloys, and its use in lithium cathode materials for new LIB's. The direct use of the high purity nickel cobalt manganese hydroxide (NiCoMn—OH) with a desired nickel to cobalt to manganese ratio, such as 1:1:1, 3:1:1, or 8:1:1, or the like, for producing new lithium cathode materials would provide an actual complete recycling of the LIB cathode materials, and thus provide a "life cycle" so to speak for LIB's. Consequently, there is an ongoing need for simple and efficient methods to recycle cobalt and nickel from LIB's and, more specifically to recover nickel cobalt manganese hydroxide (NiCoMn—OH) from the recycled LIB material recovered from LIB's. The present invention avoids or ameliorates at least some of the disadvantages of conventional methods.

SUMMARY

In one aspect, the invention provides a process for recovering nickel cobalt manganese hydroxide from recycled lithium-ion battery material. The lithium-ion battery material is mixed with an acidic water having a pH less than 2. The acidic water includes water and either sulfuric acid or hydrochloric acid. A reducing agent is adding to the recycled lithium-ion battery material. The normally acid insoluble manganese oxides are dissolved from the recycled lithium-ion battery material. The higher valent cobalt oxides and nickel oxides are dissolved from the recycled lithium-ion battery material into the acidic water. The anode carbon and other insoluble materials are filtered from the acidic water. The dissolved cobalt, nickel, and manganese oxides remain in a filtrate. The filtrate is mixed with an alkali metal hydroxide until the pH of the filtrate is greater than 8. A nickel cobalt manganese hydroxide precipitates from the filtrate. The nickel cobalt manganese hydroxide is filtered from the filtrate.

In another aspect, the invention provides a process for recovering nickel cobalt manganese hydroxide from recycled lithium-ion battery material. The recycled lithium-ion battery material is mixed with an acidic water having a pH in the range of 0.2 to 1.5. The acidic water includes water and either sulfuric acid or hydrochloric acid. Gaseous sulfur dioxide is added to the acidic water in a closed system with an approximately stoichiometric addition in the temperature range of 40° C. to 90° C. The cobalt, nickel, and manganese oxides from the recycled lithium-ion material dissolve into the acidic water. The anode carbon and other insoluble materials are filtered from the acidic water. The dissolved cobalt, nickel, and manganese oxides remain as sulfates in a filtrate. The filtrate is mixed with an aqueous sodium hydroxide until the pH of the filtrate is in the range of 3 to 5. At least one of iron, phosphate, copper, and aluminum precipitate from the filtrate. The at least one iron, phosphate, copper, and aluminum are filtered from the filtrate. The filtrate is mixed with the aqueous sodium hydroxide until the pH of the filtrate is greater than 10. A nickel cobalt manganese hydroxide precipitates from the filtrate. The nickel cobalt manganese hydroxide is filtered from the filtrate and dried.

In another aspect, the invention provides a process for recovering nickel cobalt manganese hydroxide from recycled lithium-ion battery material. The recycled lithium-ion battery material is mixed with an acidic water having a pH in the range of 0.2 to 1.0. The acidic water including water and either sulfuric acid or hydrochloric acid. Gaseous sulfur dioxide is added to the acidic water in a closed system with an approximately stoichiometric addition in the temperature range of 40° C. to 90° C. Cobalt, nickel, and manganese oxides from the recycled lithium-ion battery material dissolve into the acidic water. Anode carbon and other insoluble materials are filtered from the acidic water. The dissolved cobalt, nickel, and manganese oxides remain in a filtrate. The filtrate is mixed with aqueous sodium hydroxide until the pH of the filtrate is in the range of 3 to 5. At least one of iron, phosphate, copper and aluminum precipitate from the filtrate. The iron, phosphate, and aluminum are filtered from the filtrate. The composition ratio of nickel to cobalt to manganese is adjusted in the filtrate to a desired ratio. The filtrate is mixed with the aqueous sodium hydroxide until the pH of the filtrate is greater than 10. A nickel cobalt manganese hydroxide precipitates from the filtrate. The nickel cobalt manganese hydroxide is filtered from the filtrate and dried.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

A process has been developed for recovering a high purity (more than 90%, preferably more than 98%) mixture of nickel cobalt manganese hydroxide (NiCoMn—OH) with a higher yield (more than 85%, preferably more the 95%) from commercially available recycled Lithium-Ion Battery (LIB) material such as black mass, black powder, filter cake, or the like. The recycled LIB material may be recovered from lithium-ion battery (LIB) recycling, related waste streams from LIB cathode processing, other waste cobalt and nickel processing streams containing significant (greater than 3%) combined cobalt and nickel content, or the like. This high purity nickel cobalt manganese hydroxide (NiCoMn—OH) should have an increased value for use in the manufacture of high value alloys and chemicals, and in LIB cathode materials such as $Li(NiCo)O_2$, $Li(NiCoAl)O_2$, and $Li(NiCoMn)O_2$, depending on the starting composition of the recycled LIB and the desired new cathode composition.

The process uses commercially available recycled LIB material as the starting material and is able to process any recycled LIB material or essentially similar waste streams satisfactorily. The present commercial lower value recycled LIB material by weight typically contains:

anode carbon 20-38%
conductive carbon 5-12%
cobalt 6-18%
nickel 5-25%
copper 0.2-2.0%
manganese 8-28%
iron 0.5-2%
lithium 2-6% and small amounts of aluminum, phosphate, and unknowns.

While typical ranges are shown, the recycled LIB material may have other ranges of these elements, other elements and materials, and even the omission of an element.

The process generally includes:
the selective reductive acidulation or extraction of nickel, cobalt, and manganese from the recycled LIB material, and purification to remove carbon, aluminum, and iron; and
the precipitation of the purified nickel cobalt manganese hydroxide (NiCoMn—OH), which is filtered, washed, and dried.

Figure 1:
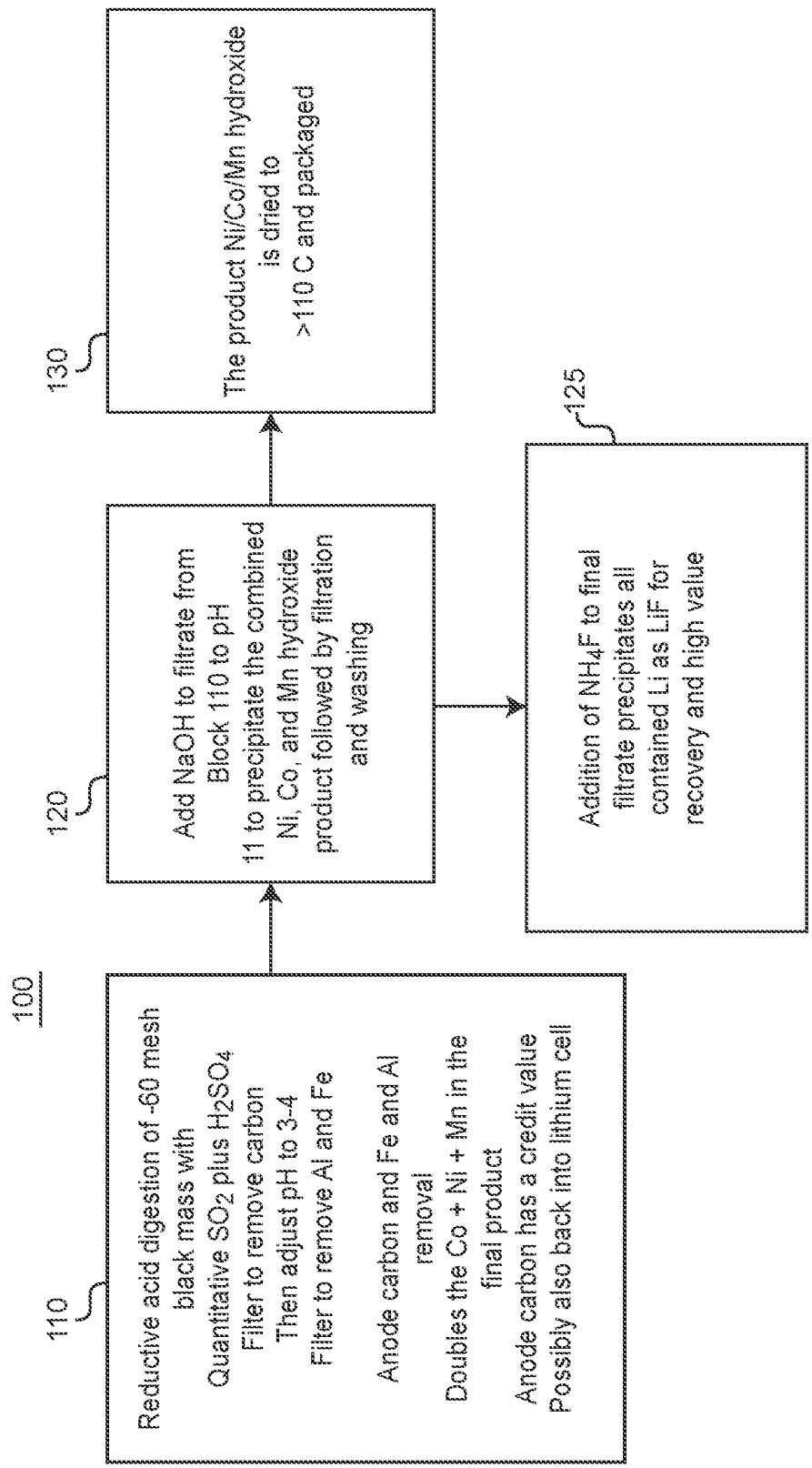
FIG. 1 represents a process for producing higher purity nickel cobalt manganese hydroxide (NiCoMn—OH) from recycled lithium-ion battery (LIB) material.
Figure 2:
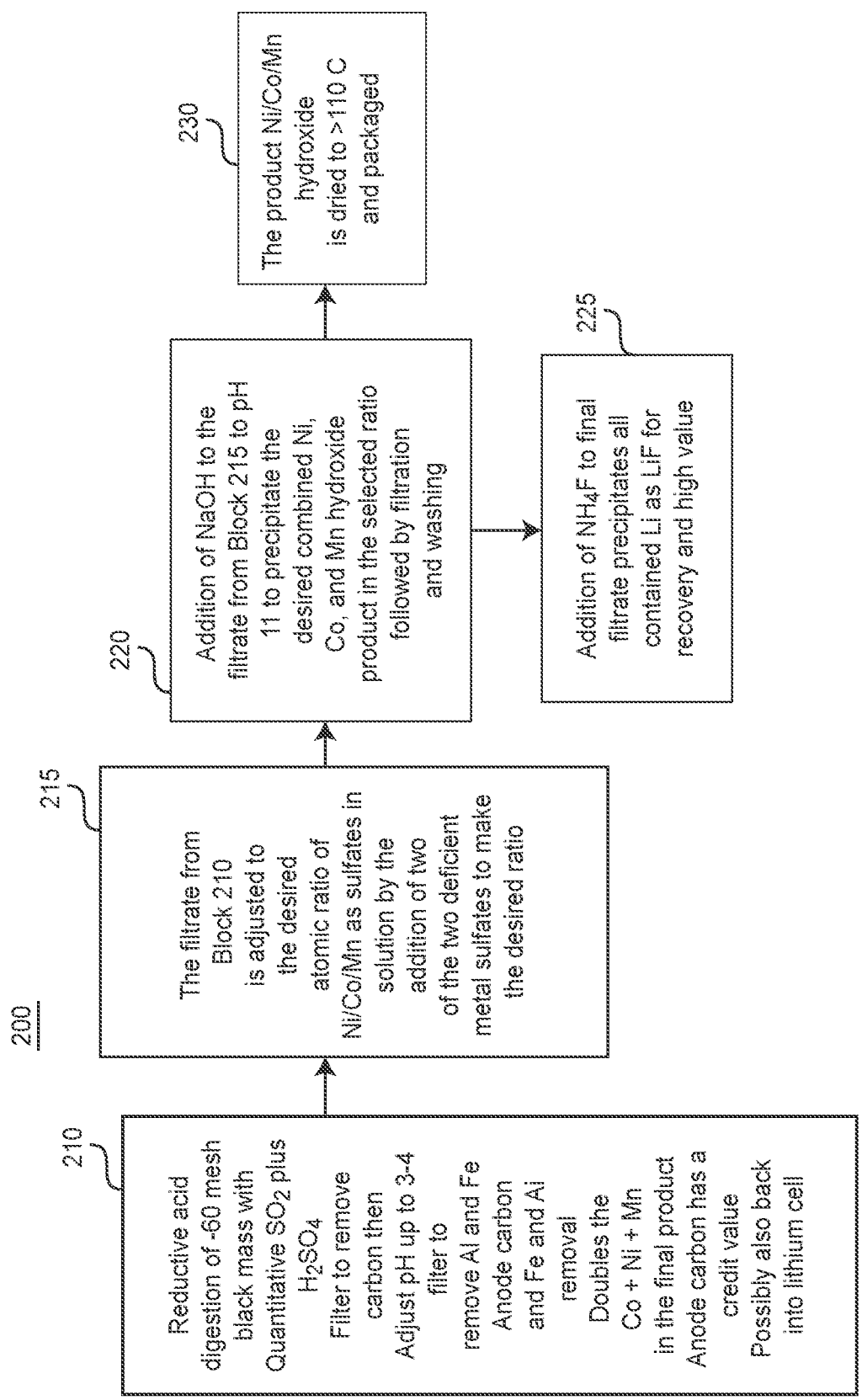
FIG. 2 represents a process for producing nickel cobalt manganese hydroxide (NiCoMn—OH) from recycled lithium-ion battery (LIB) material with the adjusted desirable composition ratios of nickel to cobalt to manganese using the required amounts of nickel, cobalt, and/or manganese salts (as sulfates, chlorides, nitrates, or acetates).
Figure 3:
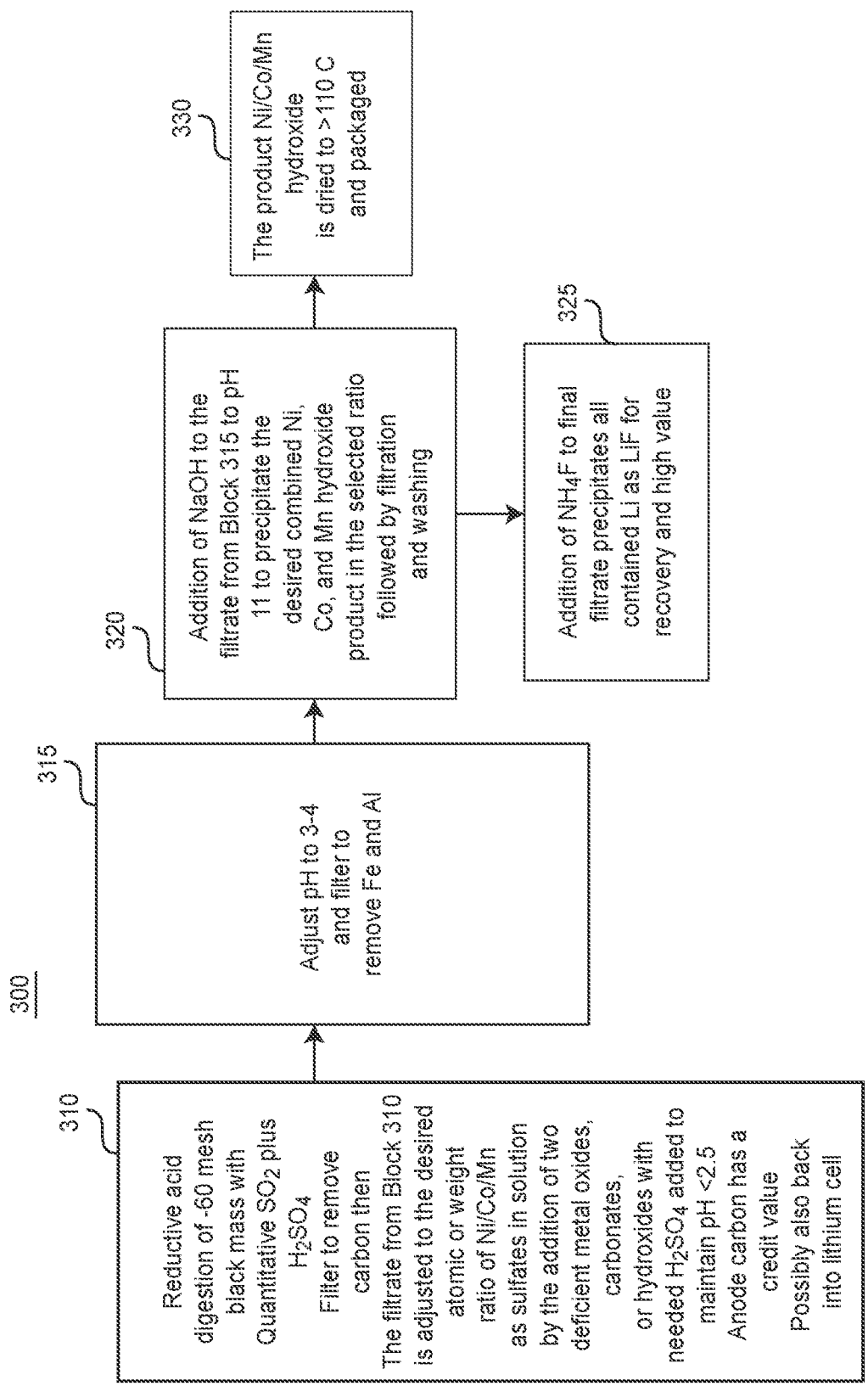
FIG. 3 represents a process for producing nickel cobalt manganese hydroxide (NiCoMn—OH) from recycled lithium-ion battery (LIB) material with the adjusted desirable atomic or weight ratios of nickel to cobalt to manganese using the required amounts of nickel, cobalt and or manganese hydroxides, carbonates, or oxides to the acidic water filtrate after the first filtration.

The process also may include the adjustment of the composition ratio (atomic ratio, weight ratio, or the like) of nickel, cobalt, and manganese in the sulfate solution with addition of two of the three metal sulfates to achieve a desired composition ratio for the desired specific LIB cathode production or other use of the nickel cobalt manganese hydroxide (NiCoMn—OH). The process may also include the addition of ammonium fluoride ($NH_4F$) to recover lithium fluoride (LiF) from the final process filtrate from extraction of the recycled LIB material. The process is represented in FIG. 1, FIG. 2, and FIG. 3, where FIG. 2 includes the adjustment of the composition ratio of nickel, cobalt, and/or manganese with metal sulfates just prior to precipitation of the nickel cobalt manganese hydroxide, and where FIG. 3 includes the adjustment of the atomic or weight ratio of nickel, cobalt, and manganese in the acidic filtrate after removal of the anode carbon with nickel, cobalt, and/or manganese hydroxides, carbonates, and oxides with acid adjustment. FIG. 1, FIG. 2, and FIG. 3 each include the option of adding ammonium fluoride or ammonium bifluoride to recover lithium fluoride.

FIG. 1 represents a process 100 for producing higher purity nickel cobalt manganese hydroxide (NiCoMn—OH) from a recycled lithium-ion battery (LIB) material such as black mass, black powder, or filter cake or the like. In block 110, nickel, cobalt, and manganese are extracted from the recycled LIB material, and carbon, aluminum, phosphate, and iron are removed. In block 120, the nickel cobalt manganese hydroxide (NiCoMn—OH) is precipitated, and subsequently filtered and washed. In block 125, the optional addition of ammonium fluoride ($NH_4F$) recovers lithium fluoride (LiF). In block 130, the nickel cobalt manganese hydroxide (NiCoMn—OH) is dried and packaged.

In block 110, the commercially available recycled LIB material as received has already been screened to about −30 to 40 mesh to remove debris. This starting material is further screened (wet or dry) to <−60 mesh to remove separator or foil trash and to minimize copper content. The oversized or +60 mesh retained material is less than 3% at this point from the initial dried recycled LIB material. The screened recycled LIB material is slurried at 35% to 50% solids in water, and concentrated sulfuric acid is added to achieve a pH of 0.5 at 25° C. This is about 4% sulfuric acid by weight of solution. The pH will vary with temperature at this low pH even when measured with a temperature correcting pH probe. In order to minimize the amount of sulfuric acid added, the rest of the acid is added to just maintain the pH at about 2 as the solubilization or acid reduction reaction proceeds with the quantitative addition of the gaseous sulfur dioxide at 70° C. to 80° C. The gaseous sulfur dioxide or other reducing agent is needed to assist in dissolving the acid insoluble manganese oxides present and possibly some higher oxide forms of cobalt associated with manganese. It is known that manganese and cobalt form acid insoluble co-precipitates. This pH is approximately equivalent to pH 0.5 at 25° C. It is important not to use more sulfuric acid than needed since additional sodium hydroxide will be required later to neutralize the excess acid. The nickel, cobalt, and manganese oxides from the recycled LIB material dissolve into the acidic water at the low pH and in the presence of the reducing agent. Heating is advantageous to this dissolution.

A closed reactor system is used for the sulfur dioxide addition reaction in order to utilize only the approximate stoichiometric amount of sulfur dioxide. Sulfur dioxide ($SO_2$) gas is immediately added at a rate to match its rate of reaction or consumption as determined by just maintaining atmospheric pressure with no gas flow or a vacuum through the closed system as determined with an oil bubbler. The sulfur dioxide is immediately absorbed and reacts with the cathode material until the reduction reaction is complete and the cathode material has dissolved usually within an hour.

The sulfur dioxide converts any acid insoluble metal oxides on the surface of the dissolving cathode particle surface to lower valent acid soluble metal oxides allowing the acid to continually dissolve the cathode particle rapidly. This unique combination of the gaseous sulfur dioxide and the acidic solution promotes this very rapid and complete reaction and solubilization of all of the cathode material in the recycled LIB material. The main insoluble oxide encountered usually is the manganese oxide or co-precipitated cobalt/manganese oxide component.

The reaction is exothermic and is cooled to maintain a temperature from 70-80° C. The gas flow rate is adjusted downward as the reaction slows to completion to prevent sulfur dioxide loss until the slurry is no longer absorbing sulfur dioxide. This reduction reaction reduces any contained insoluble cobalt and nickel+3 oxides, and the insoluble manganese+3 and +4 oxides to the soluble+2 state so that they will dissolve in the sulfuric acid solution. The addition of $SO_2$ is quantitative, but the slurry is heated up to about 90° C. and purged slightly after addition is complete to drive off any excess sulfur dioxide that may be present. The process utilizes direct $SO_2$ gas addition to the acidic slurry to reduce the insoluble higher valence metal hydroxide or oxides to the +2 acid soluble species and is low cost, quantitative, very fast, and easily controlled. The complete dissolution of the $LiMO_2$ (M=Co, Mn. Ni) in an acid base reaction goes smoothly in the presence of the sulfur dioxide ($SO_2$) and with the minimum amount of sulfur dioxide and sulfuric acid. Other reducing agents may be used. The lithium dissolves as lithium sulfate and is recovered in the final filtrate solution after recovering the nickel cobalt manganese hydroxide product.

$2H_2SO_4+SO_2+2LiMO_2$ (M+$^3$ insoluble) 

$2MSO_4$ (reduced to M$^{+2}$ dissolves in sulfuric acid)+ $Li_2SO_4$+2 $H_2O$ (M=Ni, Mn, Co)

Additional acid is added as necessary to maintain the low pH to compensate for the acid base reaction as the nickel, cobalt, and manganese oxides dissolve in the acidic water in the presence of the sulfur dioxide. Another method is to add a predetermined amount of acid initially and which, when the sulfur dioxide reduction reaction is complete, results in the pH of the resulting acidic water slurry containing the dissolved nickel, cobalt, and manganese oxides having a pH 0.5 to 1.5 at room temperature when the reaction is totally complete. When using sulfuric acid in this process, this amounts to about 4% sulfuric acid concentration. The addition of the quantitative total amount of acid in both cases results in minimizing the amount of acid to essentially the stoichiometric amount which reduces the amount of sodium hydroxide needed for the next step in the process; thereby, eliminating any excess reagent addition in the process, lowering process cost, reducing waste water treatment cost, and reducing the amount of sodium sulfate by product to the minimum.

Li(Ni,Co,Mn)O$_2$+ySO$_2$+2 HX (X=HSO$_4$, Cl)→(Ni, Co,Mn)X$_2$+2 LiX (y will vary according to the amount of manganese present)

The insoluble anode carbon and conductive carbon from the electrodes constitute about 42% to 45% of the original recycled lithium-ion battery material weight and is removed by filtration of the acid digest solution. This reductive acid solution for extraction and dissolving the recycled LIB material has only about 2% to 4% free sulfuric acid at completion (pH=0.5 to 1) at room temperature and is readily handled by stainless steel and fiberglass tankage. All the metal oxides go into solution with cobalt and manganese being the slowest for an overall complete metal extraction from the recycled LIB material. The cobalt and manganese tend to co-precipitate as a more acid insoluble complex oxide requiring a reducing agent to readily dissolve. The overall reaction takes about an hour. The acidic sulfate filtrate contains essentially all of the cobalt, nickel, manganese, alumina, phosphate, copper, and iron that was present in the recycled LIB material. The filter cake at this point contains substantially all the anode carbon, conductive carbon, and any binder residues from the electrodes. The cathode free anode carbon is recovered for reuse value.

The gaseous sulfur dioxide is added to the stirred acidic water in a closed system with an approximately stoichiometric addition in the temperature range of 40° C. to 90° C. at approximately atmospheric pressure inside the closed container. This is a rapid synergistic reaction under one hour at the low pH produced by the acid. The completion of the stoichiometric sulfur dioxide addition is determined when there is no further gas absorption as determined by a very slight rise in pressure within the closed system or using a bubbler where gas just begins to pass through. An oxygen/reduction probe can also be used to indicate when reducing conditions are beginning due to the presence of excess sulfur dioxide. The benefit of using a stoichiometric amount of sulfur dioxide reduces the chemical cost of the process by eliminating excess sulfur dioxide, reducing the subsequent need to neutralize this sulfur dioxide with additional sodium hydroxide and minimizes additional wastewater treatment cost. Upon completion of the sulfur dioxide addition, the slurry is heated to above 85° C. while acidic to remove any traces of sulfur dioxide. Additionally, the nickel, cobalt and manganese sulfites have low water solubility and therefore can be lost from the desired filtrate solution when the iron, phosphate, aluminum, and copper are precipitated at pH 3 to 5. There is also a possibility that some of the sulfite formed from any excess sulfur dioxide will precipitate in the desired nickel, cobalt manganese hydroxide product.

The nickel, cobalt, and manganese oxides from the recycled LIB material dissolve into the acidic water readily when using both the low pH from the acid and with the reducing sulfur dioxide. An additional safeguard to avoid any excess of sulfur dioxide is to then heat the acid water solution at pH less than 2 containing the solubilized nickel, cobalt, and manganese oxides as sulfates up to greater than 80° C. and sweep any gases from the now opened reactor through an aqueous scrubber to remove any last traces of excess sulfur dioxide. Anode carbon and other insoluble materials are filtered from the acidic water. The dissolved nickel, cobalt, and manganese oxides as sulfates remain in an acidic filtrate at a pH less than 2. The acidic filtrate is mixed with an aqueous sodium hydroxide until the pH of the filtrate is in the range of 3 to 5. Iron, phosphate, copper, and aluminum precipitate from the filtrate if present. The iron, phosphate, copper, and aluminum are filtered from the filtrate. A filtering aid may be used for the small amount of slow filtering iron hydroxide and aluminum hydroxide precipitate.

The pH of the initial acidic filtrate is adjusted carefully with an alkali metal hydroxide such as sodium hydroxide to pH 3 to 4 with stirring to precipitate any iron, phosphate, and aluminum present. This amount of precipitate can vary depending on the prior battery sorting of the feed stock LIB to eliminate lithium iron phosphate batteries and whether there is alumina in the cathode materials. This gelatinous precipitate is best filtered with 5% to 10% by weight of a filtering aid such as a diatomaceous earth like Celite® based on the weight of the initial recycled LIB material as a filter bed. If this second filtration step is not needed, then the pH of the initial product slurry with the anode carbon can be adjusted directly to pH 10 and filtered, eliminating one filtration step.

In block 120, the filtrate containing the nickel, cobalt, and manganese as sulfates is warmed to 50° C., vigorously stirred, and an alkali metal hydroxide such as a 50% sodium hydroxide added to increase the pH to 11. The nickel, cobalt, and manganese precipitate as hydroxides. Sulfate contamination is prevented in the mixed metal hydroxide product using the higher pH and warm solution, which is filtered and thoroughly washed to pH 9 to 10.

In block 130, the nickel cobalt manganese hydroxide (NiCoMn—OH) precipitates are dried at 110° C. A second washing of the dried precipitates is sometimes needed to remove residual sodium hydroxide or sodium carbonate. The concentration of the combined nickel, cobalt, and manganese has approximately doubled, and the product nickel cobalt manganese hydroxide weighs about 48% to 49% of the original starting recycled LIB material for a yield of more than 85%, preferably more than 95%.

In block 125, the final basic filtrate is then processed for lithium recovery. A solution of ammonium fluoride ($NH_4F$) is added to the recovered filtrate in block 110. With the fluoride equivalent to the estimated amount of contained lithium as the sulfate that is contained (about 2.5% by weight of the recycled LIB material). This slurry is filtered after 30 minutes and repulped in pH 2 hot water to remove any coprecipitated sodium fluoride (NaF) and again filtered and dried to recover lithium fluoride (LiF) at about 7% by weight of the recycled LIB material.

FIG. 2 represents a process 200 for producing nickel cobalt manganese hydroxide (NiCoMn—OH) from a recycled lithium-ion battery (LIB) material such as black mass, black powder, or filter cake or the like with a desirable composition ratio (atomic ratio, weight ratio, or the like) of nickel to cobalt to manganese. The composition ratio may be selected for a specific LIB cathode composition or similar use of the nickel cobalt manganese hydroxide (NiCoMn—OH). Blocks 210, 225, and 230 are essentially the same and include all the features of blocks 110, 125, and 130, respectively, as described previously in relation to FIG. 1. Block 220 is essentially the same and includes all the features of block 120 except that the nickel, cobalt, and manganese precipitate as hydroxides with the selected composition ratio of nickel to cobalt to manganese.

In block 215, the composition ratios (atomic ratios, weight ratios, or the like) of nickel to cobalt to manganese for final product hydroxide are adjusted prior to precipitation of nickel cobalt manganese hydroxide (NiCoMn—OH) in block 220. It is desirable to have specific composition ratios of nickel to cobalt to manganese in the final product hydroxide even though the starting recycled LIB material feed stock can vary widely in these ratios. This is very important when the nickel cobalt manganese hydroxide (NiCoMn—OH) product is used for manufacturing lithium cathode materials by the further reaction. Currently, the nickel to cobalt to manganese atomic ratios of 1:1:1, 8:1:1 and 6:2:2 are commercially popular, although other ratios may be used. Based on the elemental analysis of the starting recycled LIB material or, even better, the actual elemental analysis of the metal sulfate solution prior to adding sodium hydroxide to precipitate the metal hydroxide, the composition ratio of the metals in solution (nickel, cobalt, manganese) is adjusted to the desired ratio preferably by the addition of two of the soluble sulfate salts of manganese, nickel or cobalt. While only two of these metal sulfates need to be added to achieve the desired composition ratios of the three metals in the sulfate solution, there may be instances when only one or all three metal sulfates may be added to achieve the desired ratios. The composition ratio may be adjusted by the addition of water-soluble salts of nickel, cobalt and manganese from the group consisting of the nitrates, acetates, chlorides and sulfates. In some cases, aluminum salts may be added with pH adjustment if required for a particular cathode chemistry.

Additionally, the nickel to cobalt to manganese atomic ratio can be adjusted to a desired ratio such as 6:2:2 for current lithium cathode production by the addition of two of the three metal sulfates from the group of nickel sulfate, cobalt sulfate and manganese sulfate. The desired ratio of the three metals is determined based on one of the metals in highest concentration above the desired metals ratio and the other two metal concentrations brought up to the desired final ratio. This adjusted solution of metal sulfates can then be precipitated with sodium hydroxide to obtain the desired ratio in the nickel cobalt manganese hydroxide such as an atomic ratio of 6:2:2, 1:1:1, or other commercial lithium cathode ratios with the desired atomic ratio of nickel to cobalt to manganese. This nickel cobalt manganese hydroxide can be used/reacted with lithium hydroxide or carbonate to form the desired final product lithium cathode material with the desired nickel cobalt manganese atomic ratio such as 6:2:2; 1:1;1; and others.

Alternatively, the desired atomic or weight ratio can also be adjusted with the addition of the required amounts of the oxides, carbonates, or hydroxides of nickel, cobalt, and/or manganese to the acid water filtrate after the removal of the anode carbon. Additional acid, if required, is added to maintain the pH of the solution below 3 to assist the solution of these oxides, carbonates, or hydroxides. The ability to utilize recycled LIB material by being able to purify it, and then adjust the composition ratios of the nickel, cobalt, manganese and even add additional metals such as aluminum to the solution of the resulting sulfates or chlorides and also determine ratios in the subsequently precipitated nickel cobalt manganese hydroxide will increase the economic gain for recycling LIB's, especially for the smaller LIB's used in electronic applications. These recycled materials would be a higher purity and lower cost source of nickel cobalt manganese sulfate or hydroxide feedstock for producing new lithium-ion battery cathode materials.

FIG. 3 represents another process 300 for producing nickel cobalt manganese hydroxide (NiCoMn—OH) from a recycled lithium-ion battery (LIB) material such as black mass, black powder, or filter cake or the like with desirable composition ratios (atomic ratios, weight ratios, or the like) of nickel to cobalt to manganese. The composition ratios may be selected for a specific LIB cathode composition or similar use of the nickel cobalt manganese hydroxide (NiCoMn—OH). Blocks 325, and 330 are essentially the same and include all the features of blocks 125 and 130 and of blocks 225 and 230 as previously described in relation to FIG. 1 and FIG. 2, respectively. Block 320 is essentially the same and includes all the features of block 220. Blocks 320 and 220 are essentially the same as block 120 except that the nickel, cobalt, and manganese precipitate as hydroxides with the selected composition ratio of nickel to cobalt to manganese.

In block 310, the commercially available recycled LIB material is processed essentially the same as in blocks 110 and 210 except that the desirable composition ratios of nickel to cobalt to manganese are adjusted by using the required amounts of nickel, cobalt and or manganese hydroxides, carbonates, or oxides to the acidic water filtrate after the first filtration. The filtrate is adjusted to the to the desired composition by adding the required amounts of the oxides, carbonates, or hydroxides of the required metals (nickel, cobalt, or manganese) for the adjustment to the acidic water filtrate obtained after filtering off the anode carbon cake. The two deficient metal oxides or hydroxides are added with sulfuric acid as previously described in relation to block 215. Additional acid is added to just maintain the pH less than 3, preferably less than 2.5, to assist the solution of the oxides or hydroxides.

In block 315, the resulting acidic water solution may be adjusted to pH 3 to 4 to precipitate any iron, phosphate, copper, or aluminum which is filtered off preferably with a filter aid. The acidic filtrate is mixed with an aqueous sodium hydroxide until the pH of the filtrate is in the range of 3 to 5. Iron, phosphate, and aluminum precipitate from the filtrate. The iron, phosphate, and aluminum are filtered from the filtrate. A filtering aid may be used for the small amount of slow filtering iron hydroxide and aluminum hydroxide precipitate. The resulting solution with the required composition ratio can be used for a feedstock for other chemical processes.

The pH of the filtrate is adjusted carefully with an alkali metal hydroxide such as sodium hydroxide to pH 3-4 with stirring to precipitate any iron, phosphate, and aluminum present. This amount of precipitate can vary depending on the prior battery sorting of the feed stock LIB to eliminate lithium iron phosphate batteries and whether there is alumina in the cathode materials. This gelatinous precipitate is best filtered with 5-10% by weight of a filtering aid such as a diatomaceous earth like Celite® based on the weight of the initial recycled LIB material as a filter bed. Other filtering aids may be used for the small amount of slow filtering iron hydroxide and aluminum hydroxide precipitate.

In block 320, The purified filtrate with the desired ratio of nickel to cobalt to manganese is then treated with 50% sodium hydroxide until the pH of the filtrate is greater than 10, preferably 11, to precipitate the desired nickel cobalt manganese hydroxide product with the desired nickel to cobalt to manganese composition ratio essentially same as described in relation to block 220. The nickel cobalt manganese hydroxide (NiCoMn—OH) is filtered from the filtrate and washed.

In the case of current LIB production scrap, the recovered sulfate solution contains the same ratio as the starting cathode material and no adjustment is necessary prior to precipitating the desired nickel cobalt manganese hydroxide (NiCoMn—OH) product for recycling to new cathode production. After adjustment to the desired composition ratio of nickel to cobalt to manganese, aqueous sodium hydroxide is then added up pH greater than 11 with some heating to ensure that the product hydroxide is sulfate free. The slurry is filtered and washed until the filtrate is pH 9 to 10 and then dried at 110° C. to produce the desired nickel cobalt manganese hydroxide (NiCoMn—OH) product with the metal at the desired composition ratio for LIB cathode production.

The following examples illustrate one or more preferred embodiments of the invention. Numerous variations may be made to the following examples that lie within the scope of the invention.

Example 1

The starting material was 200 g of black mass from Retriev Technologies (a commercial LIB recycler) that was screened to −60 mesh and had a composition of 9.55% Co; 12.62% Ni, and 13.54% Mn. A 50% solids slurry was made by adding 200 g black mass to 200 g water to make. While stirring this slurry, 99 g. of 98% sulfuric acid was added carefully to bring the pH down to 0.5 and the temperature was allowed to climb to 60° C. and maintained there. Then a stream of sulfur dioxide was slowly added below the surface of the slurry at a rate equal to the absorption rate (reaction rate). The gas flow was slowly reduced over time to approximate the rate of reaction over 70 minutes for a total of 56.5 g. of sulfur dioxide. Sulfuric was also added over this period to maintain the pH at 0.5 as the cathode cake dissolved for total addition of 106 g. The slurry was stirred for 1 hour at 60° C. after the sulfur dioxide addition was complete. The slurry was then filtered. The initial wash of the filter cake was combined with the filtrate. The subsequent washes contained the equivalent of 12 g of mixed metal (Ni, Mn, and Co) hydroxides which was subsequently was cycled back to the make-up water for the next black mass extraction batch. The filter cake was composed of entirely the carbon content (anode carbon and conductive carbon) weighed 81.4 g. and contained <0.5% Co and <0.1% Ni.

The pH of the filtrate was adjusted to 3.5-4 with 12 g of 50% NaOH and filtered to remove any Fe, Al, and any other precipitates at that point. The pH of this filtrate was then adjusted to pH 11 with 195 g. 50% NaOH and heated at 50° C. and stirred 3 hours and filtered. The product nickel cobalt manganese hydroxide (NiCoMn—OH), after washing and dried at 110° C., weighed 111 g. It contained 19.0% Co, 25.1% Ni, and 26.1% Mn. The overall recovery yield of nickel and cobalt was 96% including the amount recycled back to the next make up water for the next batch.

Example 2

The objective of this 1-Kg example was for upgrading the black mass two-fold to pure mixed nickel cobalt manganese hydroxide (NiCoMn—OH). The starting material was 1038 g of dried commercial black mass (−60 mesh) from Retriev Technologies, which was slurried with 1269 g of recovered filtrate from a prior example while 593 g concentrated sulfuric acid was added slowly over 30 minutes with good stirring. The initial analysis of the dried black mass prior to screening was: Co 9.87%; Ni 15.61%; Mn 6.02%. This an atomic ratio of 2.4Ni:1.53Co; 1.10Mn.) The addition was exothermic, and the temperature allowed to rise to 70° C. before cooling with ice to bring the temperature back to about 50° C. The pH stabilized at about 2 as measured with a pH probe at this temperature. At room temperature, the pH as measured by the probe was 0.5 for this same slurry. The reactor was closed off with an oil bubbler connected to determine the relative rate of flow of $SO_2$ into the reactor. Sulfur dioxide gas was then added at a rate equal to its rate of reaction and absorption to reduce the higher valence manganese oxide and other oxides to allow continue dissolution of the cathode material by the acid. This was noted by observing the very slow bubbling through the bubbler to just maintain a slight positive pressure of sulfur dioxide in the reactor. As this exothermic reaction proceeded and gradually slowed, the sulfur dioxide flow was gradually adjusted downward until the reaction appeared complete. The pH was monitored, and additional sulfuric acid was added, if necessary, to maintain the pH about 2 at 50° C. A total of 189.4 g sulfur dioxide was added. The slurry was stirred an additional 30 minutes at 50° C. and then filtered. The final pH of the filtrate was 0.5 at room temperature. The carbon filter cake was repulped for 30 minutes with 800 ml water and filtered. This was again repeated and both filtrates combined with the main filtrate. The carbon filter cake was again repulped twice with 550 ml water and filtered. These two filtrates were used for the initial slurry make up for the next black mass extraction run. These two filtrates contained approximately 22 g of cobalt plus nickel. The carbon filter cake was dried at 110° C. and weighed 436.5 g. Cobalt analyses were less than 0.05%).

The pH of the combined main filtrates (3000 ml) was adjusted to pH 3-4 with 40 g of 15% NaOH solution and stirred 1 hour and then filtered with a bed of Celite filtering aid to remove all the iron, alumina, phosphate, and any copper as insolubles and washed slightly. The atomic ratio of the Ni to Co to Mn was adjusted to 6:2:2 by the addition of 97.7 g manganous sulfate monohydrate and 679.6 g nickel sulfate heptahydrate (20.6% Ni). The solution was warmed and stirred until all salts dissolved. The filtrate (3600 ml) was then stirred and 50%

NaOH added to bring the pH up to 11 and the slurry stirred for 1 hour at 40° C. to 50° C. This slurry was then filtered, and the filtrate set aside to recover the lithium as lithium fluoride (LiF) later. The product cake was repulped with 500 ml water and filtered to provide good washing. This was repeated until the washings were pH 10.5 and the product nickel cobalt manganese hydroxide (NiCoMn—OH) dried at 110° C. The product weighed 531.8 g. The analysis was Ni: 34.22%; Co:11.55%; and Mn: 11.49%. This is an essentially a 6:2:2 atomic ratio in the concentration of the metals in the product. The carbon was purified separately by screening through −325 mesh to remove traces of metal particles and binder fluff to produce 430 g anode carbon plus conductive carbon mixture.

Example 3

The objective of this 1-Kg example is to upgrade the black mass two-fold to pure mixed nickel cobalt manganese hydroxide (NiCoMn—OH). The starting material was 1013.4 g of dried commercial black mass (−60 mesh) from Retriev Technologies, which was slurried with 1252 g of recovered filtrate from a prior example while 550.5 g concentrated sulfuric acid was added slowly over 30 minutes with good stirring. The initial analysis of the dried Retriev lot #2 black mass prior to screening was: Co 7.79%; Ni 15.24%; Mn 4.35%. The addition was exothermic, and the temperature allowed to rise to 70° C. before cooling with ice to bring the temperature back to about 50° C. The pH stabilized at about 2 as measured with a pH probe at this temperature. At room temperature, the pH as measured by the probe was 0.5 for this same slurry. The reactor was closed off with an oil bubbler connected to determine the relative rate of flow of $SO_2$ into the reactor. Sulfur dioxide gas was then added at a rate equal to its rate of reaction and absorption to reduce the higher valence manganese oxide and other oxides to allow continue dissolution of the cathode material by the acid. This was noted by observing the very slow bubbling through the bubbler to just maintain a slight positive pressure of sulfur dioxide in the reactor. As this exothermic reaction proceeded and gradually slowed, the sulfur dioxide flow was gradually adjusted downward until the reaction appeared complete. The pH was monitored, and additional sulfuric acid was added, if necessary, to maintain the pH about 2 at 50° C. A total of 158.9 g sulfur dioxide was added. The slurry was heated to 90° C. and the reactor opened, and air was passed over the hot solution to remove any traces of sulfur dioxide present. The slurry was cooled and stirred an additional 30 minutes at 50° C. and then filtered. The final pH of the filtrate was 0.5 at room temperature. The carbon filter cake was repulped for 30 minutes with 800 ml water and filtered. This was again repeated and both filtrates combined with the main filtrate. The carbon filter cake was again repulped twice with 550 ml water and filtered. These two filtrates were used for the initial slurry make up for the next black mass extraction run. These two filtrates contained approximately 22 g of cobalt plus nickel. The carbon filter cake was dried at 110° C. and weighed 477 g. Cobalt analyses were less than 0.05%.

The pH of the combined filtrate (3000 ml) was adjusted to pH 3-4 with 40 g of 15% NaOH solution and stirred 1 hour and then filtered with a bed of Celite filtering aid to remove all the iron, aluminum, phosphate, and any copper as insoluble and washed slightly. The filtrate (3300 ml) was then stirred and 50% NaOH added to bring the pH up to 11 and the slurry stirred for 1 hour at 40-50° C. This slurry was then filtered, and the filtrate set aside to recover the lithium as LiF later. The product cake was repulped with 500 ml water and filtered to provide good washing. This was repeated and the product nickel cobalt manganese hydroxide (NiCoMn—OH) dried at 110° C. The product weighed 474 g. The analysis of the product was: Co, 15.70%; Ni, 31.47%; Mn, 9.14%; and Li, 0.06%. The overall yield was 94% based on nickel and cobalt when the final two filtrates are included. The carbon was purified separately by screening through −325 mesh to remove traces of metal particles and binder fluff to produce 430 g anode carbon plus conductive carbon mixture. $NH_4F$ solution was added to final clear filtrate to recover 77 g LiF about 70% of calculated if all the calculated lithium was present in the recovered black mass. About half of the sodium sulfate hydrate crystal present was recovered on crystallization and drying and is salable. This simplifies wastewater treatment.

Example 4

The objective of this 1-Kg example is to upgrade the black mass two-fold to pure mixed nickel cobalt manganese hydroxide (NiCoMn—OH). The starting material is 1000 g of dried commercial black mass (−60 mesh) from Retriev Technologies was slurried with 1222 g water while 534 g concentrated sulfuric acid which was added slowly over 30 minutes with good stirring. The initial analysis of the dried black mass prior to screening was: Co 9.87%; Ni 15.61%; Mn 6.02%. The addition was exothermic, and the temperature allowed to rise to 70° C. The slurry was cooled with ice to bring the temperature back to about 50° C. The pH stabilized at about 2 as measured with a pH probe at this temperature. At room temperature, the pH as measured by the probe was 0.5 for this same slurry. The reactor was closed off with an oil bubbler connected to determine the relative rate of flow of $SO_2$ into the reactor. Sulfur dioxide gas was then added at a rate equal to its rate of reaction and absorption to reduce the higher valence manganese oxide and other oxides to allow continue dissolution of the cathode material by the acid. This was noted by observing the very slow bubbling through the bubbler to just maintain a slight positive pressure of sulfur dioxide in the reactor. As this exothermic reaction proceeded and gradually slowed, the sulfur dioxide flow was gradually adjusted downward until the reaction appeared complete. The pH was monitored, and additional sulfuric acid was added, if necessary, to maintain the pH about 2 at 50° C. A total of 150 g sulfur dioxide was added. The slurry was heated to 90° C. and the reactor opened, and air was passed over the hot solution to remove any traces of sulfur dioxide present. The slurry was cooled and stirred an additional 30 minutes at 50° C. and then filtered. The final pH of the filtrate was 0.5 at room temperature. The carbon filter cake was repulped for 30 minutes with 800 ml water and filtered. This was again repeated and both filtrates combined with the main filtrate. The carbon filter cake was again repulped twice with 550 ml water and filtered. These two filtrates were used for the initial slurry make up for the next black mass extraction run. These two filtrates contained approximately 20 g of cobalt plus nickel. The carbon filter cake was dried at 110° C. and weighed 451 g. Cobalt analyses were less than 0.05%.

The pH of the combined main filtrates (3000 ml) was adjusted to pH 3-4 with 40 g of 15% NaOH solution and stirred 1 hour and then filtered with a bed of Celite filtering aid to remove all the iron, aluminum, phosphate, and any copper as insoluble and washed slightly. The filtrate (3300 ml) was then stirred and 50% NaOH added to bring the pH up to 11 and the slurry stirred for 1 hour at 40-50° C. This slurry was then filtered, and the filtrate set aside to recover the lithium as LiF later. The product cake was repulped with 500 ml water and filtered to provide good washing. This was repeated and the product nickel cobalt manganese hydroxide (NiCoMn—OH) dried at 110° C. The product weighed 489 g. The analysis was Co: 14.83%; Ni: 26.54% and Mn: 9.75%. This was 1.6-fold increase in the concentration of the metals in the product. The overall yield was 94% based on Co and Ni when the final two filtrates are included. The carbon was purified separately by screening through −325 mesh to remove traces of metal particles and binder fluff to produce 430 g anode carbon plus conductive carbon mixture.

Example 5

The objective of this 1-Kg example is to upgrade black mass two-fold to pure mixed nickel cobalt manganese hydroxide (NiCoMn—OH). The starting material was 1038 g of dried commercial black mass (−60 mesh) from Retriev Technologies was slurried with 1269 g of recovered filtrate from a prior example while 593 g concentrated sulfuric acid was added slowly over 30 minutes with good stirring. The initial analysis of the dried black mass prior to screening was: Co 9.87%; Ni 15.61%; Mn 6.02%. The addition was exothermic, and the temperature allowed to rise to 70° C. before cooling with ice to bring the temperature back to about 50° C. The pH stabilized at about 2 as measured with a pH probe at this temperature. At room temperature, the pH as measured by the probe was 0.5 for this same slurry. The reactor was closed off with an oil bubbler connected to determine the relative rate of flow of $SO_2$ into the reactor. Sulfur dioxide gas was then added at a rate equal to its rate of reaction and absorption to reduce the higher valence manganese oxide and other oxides to allow continue dissolution of the cathode material by the acid. This was noted by observing the very slow bubbling through the bubbler to just maintain a slight positive pressure of sulfur dioxide in the reactor. As this exothermic reaction proceeded and gradually slowed, the sulfur dioxide flow was gradually adjusted downward until the reaction appeared complete. The pH was monitored, and additional sulfuric acid was added, if necessary, to maintain the pH about 2 at 50° C. A total of 189.4 g sulfur dioxide was added. The slurry was stirred an additional 30 minutes and heated to 90° C. and the reactor opened, and a slight air stream applied for 10 minutes to remove any sulfur dioxide that might remain. The slurry was then filtered after cooling to 50° C. The final pH of the filtrate was 0.5 at room temperature. The carbon filter cake was repulped for 30 minutes with 800 ml water and filtered. This was again repeated and both filtrates combined with the main filtrate. The carbon filter cake was again repulped twice with 550 ml water and filtered. These two filtrates were used for the initial slurry make up for the next black mass extraction run. These two filtrates contained approximately 24 g of cobalt plus nickel. The carbon filter cake was dried at 110° C. and weighed 436.5 g. Cobalt analyses were less than 0.05%.

The pH of the combined main filtrates (3000 ml) was adjusted to pH 3-4 with 40 g of 15% NaOH solution and stirred 1 hour and then filtered with a bed of Celite filtering aid to remove all the iron, aluminum, phosphate, and any copper as insoluble and washed slightly. The filtrate (3300 ml) was then stirred and 50% NaOH added to bring the pH up to 11-12 and the slurry stirred for 1 hour at 40-50° C. This slurry was then filtered, and the filtrate set aside to recover the lithium as LiF later. The product cake was repulped with 500 ml water and filtered to provide good washing. This was repeated and the product nickel cobalt manganese hydroxide (NiCoMn—OH) dried at 110° C. The product weighed 531.8 g. The analysis was Co: 17.78%; Ni: 27.14% and Mn: 9.81%. This is an essentially 2-fold increase in the concentration of the metals in the product. The overall yield was 94% based on Co and Ni when the final two filtrates are included. The carbon was purified further by separately screening through −325 mesh to remove traces of metal particles and binder fluff to produce 430 g anode carbon plus conductive carbon mixture.

Example 6

The objective of this 1-Kg example is to upgrade black mass two-fold to pure mixed Ni/Co/Mn Hydroxide. The starting material was 1020 g of dried commercial black mass (−60 mesh) from Retriev Technologies was slurried with 1205 g of recovered filtrate from a prior example while 603 g concentrated sulfuric acid was added slowly over 30 minutes with good stirring. The initial analysis of the dried black mass prior to screening was: Ni 15.24%; Co 7.79%; Mn 4.35%. This is an atomic ratio of Ni/Co/Mn of 3.96:1.32:0.79. The addition was exothermic, and the temperature allowed to rise to 70° C. before cooling with ice to bring the temperature back to about 50° C. The pH stabilized at about 2 as measured with a pH probe at this temperature. At room temperature, the pH as measured by the probe was 0.5 for this same slurry. The reactor was closed off with an oil bubbler connected to determine the relative rate of flow of $SO_2$ into the reactor. Sulfur dioxide gas was then added at a rate equal to its rate of reaction and absorption to reduce the higher valence manganese oxide and other oxides to allow continue dissolution of the cathode material by the acid. This was noted by observing the steady level in the bubbler indicating no gas was escaping. very slow bubbling through the bubbler to just maintain a slight positive pressure of sulfur dioxide in the reactor. As this exothermic reaction proceeded and gradually slowed, the sulfur dioxide flow was gradually adjusted downward until the reaction appeared complete. The pH was monitored, and additional sulfuric acid was added, if necessary, to maintain the pH about 2 at 50° C. A total of 172 g sulfur dioxide was added. The slurry was stirred an additional 30 minutes and heated to 90° C.

and the reactor opened, and a slight air stream applied for 10 minutes to remove any sulfur dioxide that might remain. The slurry was then filtered after cooling to 50° C. The final pH of the filtrate was 0.5 at room temperature. The carbon filter cake was repulped for 30 minutes with 800 ml water and filtered. This was again repeated and both filtrates combined with the main filtrate. The carbon filter cake was again repulped twice with 550 ml water and filtered. These two filtrates were used for the initial slurry make up for the next black mass extraction run. These two filtrates contained approximately 20 g of cobalt plus nickel. The carbon filter cake was dried at 110° C. and weighed 430.7 g. Cobalt analyses were less than 0.05%.

In order to adjust the atomic ratio of Ni/Co/Mn to 6:2:2, 36.0 g of Ni(OH)$_2$ and 38.3 g of MnO were added to the acidic water filtrate and stirred with warming to 50° C. and sulfuric acid gradually added to maintain the pH less than 2.5 in order to dissolve the MnO and Ni(OH)$_2$.

The pH of the combined main filtrates (3600 ml) after the addition of the MnO and Ni(OH)$_2$ was adjusted to pH 3 to 4 with 25 g of 15% NaOH solution and stirred 1 hour and then filtered with a bed of Celite filtering aid to remove all the iron, aluminum, phosphate, and any copper as insoluble and washed slightly. The filtrate (3500 ml) was then stirred and 50% NaOH added to bring the pH up to 11 and the slurry stirred for 1 hour at 40° C. to 50° C. This slurry was then filtered, and the filtrate set aside to recover the lithium as LiF later. The product cake was repulped with 500 ml water and filtered to provide good washing. This was repeated and the product Ni/Co/Mn hydroxide dried at 110° C. The product weighed 523.7 g. The analysis was: Ni, 35.10%; Co, 11.72%; and Mn, 11.34%. This is an atomic ratio of 6:2:2 for the nickel cobalt manganese hydroxide product.

To provide a clear and more consistent understanding of the specification and claims of this application, the following definitions are provided.

Unless otherwise indicated, all numbers expressing quantities of ingredients, properties such as amounts, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed in light of the margin of error, the number of reported significant digits, and by applying ordinary rounding techniques.

Described methods can be performed in any suitable order unless otherwise stated. Unless the context clearly dictates otherwise, where a range of values is provided, each intervening value to the tenth of the unit of the lower limit between the lower limit and the upper limit of the range is included in the range of values. The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A process for recovering a nickel cobalt manganese hydroxide from a recycled lithium-ion battery material including anode and cathode material, comprising:
    mixing a recycled lithium-ion battery material with an acidic water having a pH less than or equal to 2, the acidic water including water and an acid chosen from sulfuric acid and hydrochloric acid;
    then adding a reducing agent to the recycled lithium-ion battery material;
    filtering insoluble materials from the acidic water to produce a filtrate;
    mixing the filtrate with an alkali metal hydroxide to precipitate a nickel cobalt manganese hydroxide from the filtrate; and
    recovering the precipitated nickel cobalt manganese hydroxide.

2. The process of claim 1, where the acidic water has a pH in the range of 0.2 to 2.0.

3. The process of claim 1, where the acidic water has a pH of 0.5.

4. The process of claim 1, where the reducing agent is gaseous sulfur dioxide.

5. The process of claim 4, further comprising adding the gaseous sulfur dioxide to the recycled lithium-ion battery material in the temperature range of 40° C. to 90° C.

6. The process of claim 5, further comprising adding sulfuric acid to maintain a pH of 0.5 to 2.

7. The process of claim 1, further comprising:
    a. mixing the filtrate with the alkali metal hydroxide until a pH of the filtrate is in the range of 3 to 5;
    b. precipitating at least one of iron, phosphate, copper, and aluminum from the filtrate; and
    c. filtering the at least one iron, phosphate, copper, and aluminum from the filtrate.

8. The process of claim 1, further comprising mixing the filtrate with the alkali metal hydroxide until a pH of the filtrate is greater than 8.

9. The process of claim 1, where the alkali metal hydroxide is aqueous sodium hydroxide.

10. The process of claim 1, further comprising drying the nickel cobalt manganese hydroxide.

11. The process of claim 1, further comprising adjusting a composition ratio of nickel to cobalt to manganese in the filtrate to a desired ratio prior to the precipitation of the nickel cobalt manganese hydroxide with the alkali metal hydroxide.

12. The process of claim 11, further comprising adding at least one metal sulfate chosen from the group cobalt sulfate, nickel sulfate, and manganese sulfate.

13. The process of claim 11, further comprising adding an oxide or hydroxide chosen from nickel, cobalt, and manganese while the pH of the filtrate is less than 2.5.

14. The process of claim 1, further comprising screening the filtered insoluble materials to −325 mesh to recover anode carbon.

15. The process of claim 14 further comprising heating the recovered anode carbon to more than 250° C.

16. The process of claim 1, further comprising:
   a. treating a filtrate from the nickel cobalt manganese hydroxide precipitation with a water-soluble fluoride compound; and
   b. precipitating lithium fluoride from the filtrate from the nickel cobalt manganese hydroxide precipitation.

17. The process of claim 16, where the water-soluble fluoride is one of ammonium fluoride and ammonium bifluoride.

18. The process of claim 16, further comprising recovering sodium sulfate from a filtrate from the lithium fluoride precipitation.

19. The process of claim 1, where the recycled lithium-ion battery material comprises black mass.

20. The process of claim 1, where the recycled lithium-ion battery material comprises greater than 3% by weight combined cobalt and nickel content.

21. The process of claim 1, where the recycled lithium-ion battery material is screened to about −30 to 40 mesh before mixing with the acidic water.

22. The process of claim 1, where the recycled lithium-ion battery material is screened to <−60 mesh before mixing with the acidic water.

23. The process of claim 1, where the precipitated nickel cobalt manganese hydroxide is more than 90% pure by weight.

* * * * *